United States Patent [19]

Heske

[11] 4,109,147
[45] Aug. 22, 1978

[54] OPTICAL POSITION SENSOR

[75] Inventor: William Albert Heske, Fairfield, Conn.

[73] Assignee: Dresser Industries, Inc., Dallas, Tex.

[21] Appl. No.: 684,610

[22] Filed: May 10, 1976

[51] Int. Cl.² ............................................. G01D 5/34
[52] U.S. Cl. ........................... 250/231 P; 250/231 R; 250/209
[58] Field of Search ............... 250/231 R, 231 P, 561, 250/208, 209, 229; 356/156; 340/347 AD

[56] References Cited

U.S. PATENT DOCUMENTS

| | | | |
|---|---|---|---|
| 3,316,547 | 4/1967 | Ammann | 340/347 AD |
| 3,730,633 | 5/1973 | Kennedy | 356/156 |
| 3,742,233 | 6/1973 | Gorgens et al. | 250/231 P |
| 3,768,311 | 10/1973 | Gorgens et al. | 250/231 |
| 3,788,795 | 1/1974 | Zeitlin | 250/231 P |

Primary Examiner—Alfred E. Smith
Assistant Examiner—David K. Moore
Attorney, Agent, or Firm—Daniel Rubin

[57] ABSTRACT

A transducer for converting position displacement into a digital output signal correlated to the current placement state. An opaque vane is operably movable transversely in a radiation path between a radiation source and two juxtaposed radiation sensitive diodes. Discrete signals, emitted by each of the diodes in relation to the amount of their respective surface areas exposed to radiation, are converted by logic and a dual slope integrating analog-to-digital converter to a useful digital output signal. In one embodiment, both diodes are subject to having exposed radiation interrupted by the vane. Logic supplies the difference of the diode signals to the converter as its measured input while a sum signal is supplied thereto as its reference input. The ratio of input signals is then emitted by the converter as an output signal indicative of the current placement state. In another embodiment, only one diode is subject to having radiation interrupted by the vane and its signal comprises the measured input to the converter while the other diode signal comprises the reference input.

24 Claims, 7 Drawing Figures

OPTICAL POSITION SENSOR

BACKGROUND OF THE INVENTION

1. The field of art to which the invention pertains comprises the art of measuring and testing in which electrical signals are generated in relation to photo optically detected position changes.

2. Instrumentation capable of converting or transducing displaced motion into intelligently useful data are widely used in an endless number of applications. Photo optical concepts for that purpose are likewise disclosed in an untold number of patents exemplified by U.S. Pat. Nos. 2,651,019; 3,444,348; 3,480,781; and 3,742,233.

As a usual matter, such prior art position sensors have employed a single photo sensor in combination with a light source. It is known, however, that either or both the sensor or light source are subject to operational fluctuations of temperature, voltage, or the like to which the equipment is exposed. Such fluctuations when they occur can introduce significant error adversely affecting output accuracy of the device. Yet despite recognition of the problem, it has not heretofore been known how to immunize prior systems from such effects.

SUMMARY OF THE INVENTION

The invention relates to a transducer for converting position displacement into a digital electrical signal correlated to the current state of a position placement. More specifically, the invention relates to such a transducer which is substantially if not completely immune to the inaccuracies that previously resulted from fluctuations in temperature and/or voltage in the manner of the prior art. The foregoing is achieved in accordance herewith by utilizing an opaque vane operably displaceable in a radiation path between a source of radiation and a pair of juxtaposed radiation sensitive diode chips. Discrete signals emitted by each of the diodes are correlated to their radiation exposed surface areas, i.e. uninterrupted by the opaque vane. The circuit receiving the diode signals includes logic and a dual slope integrating analog-to-digital converter which converts the received signals to a useful digital output. In one embodiment both diodes are subject to vane action and the converter receives the difference in diode signals as its measured input and the sum of diode signals as its reference input. On the basis of the received signals the converter emits a digital output signal correlated as a ratio thereof indicative of the current position state of the vane. In another embodiment only one diode is subject to vane action such that its signal comprises the measured input to the converter while the signal from the fully exposed diode comprises the reference input. In either instance the digital output is a function only of the compared signals such that the effect of temperature and/or voltage change is inherently eliminated.

It is therefore an object of the invention to provide a novel photo optical transducer for converting the current state of position placement to a digital electrical output signal.

It is a further object of the invention to provide a transducer as in the previous object that is substantially, if not completely, immune to temperature and/or voltage caused errors which adversely affected accuracy of similar purpose devices of the prior art.

It is a still further object of the invention to effect the foregoing objects in a novel and economical manner in which such errors associated with prior art devices are inherently eliminated by utilizing comparative input signals as a basis for deriving the correlated output signal indicative of a current position state.

Figure 1:
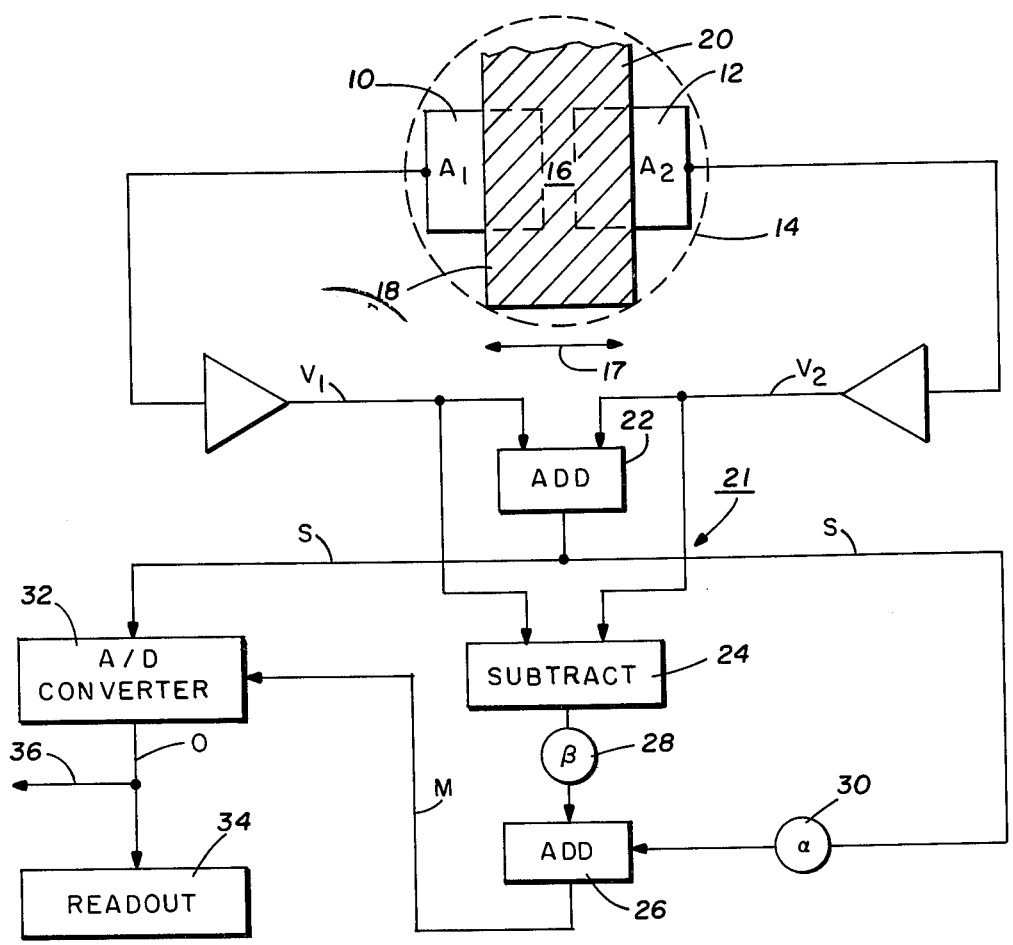
FIG. 1 is a schematic illustration of a first embodiment of the invention.

Referring initially to FIG. 1 of the drawings, the embodiment thereof is comprised of two juxtaposed radiation sensitive diode chips 10 and 12 of precisely determined active surface areas $A_1$ and $A_2$, respectively. Directed toward the diodes for effecting their exposure is a uniform light field 14 of radiation wave length selected at or near peak sensitivity of the diodes. Within the light path in interrupting relation to the diodes is a transversely movable opaque vane 16 that is subject to displacement in the direction of arrow 17 past the diode surfaces. A variety of end use mechanisms can be employed for displacing vane 16 to obtain a digital readout of its placement position as will be understood.

As illustrated, vane 16 is in the mid-scale position with usable vane motion being limited by physical size of the diodes whereby both vane side edges 18 and 20 are always contained within the active diode surface areas. Zero position is achieved when left vane edge 18 is substantially superposed with the leftmost active portion of diode 10 placing its right vane edge 20 just to the right of the left edge of diode 12. Full scale position of vane 16 is achieved at its opposite extreme when right vane edge 20 is superposed with the rightmost active area of diode 12 and left edge 18 is just to the left of the right edge of diode 10. Suitable for these purposes are diodes commercially designated SPX-1744 from Spectronics, Inc. of Richardson, Texas, having a spectral response of 830 NM with a light current sensitivity of 2.0 microamps per microwatt per square centimeter. An SE3455 L.E.D. light source of the same manufacturer provides compatible spectral output.

Displacement of vane 16 over more and less of the surface areas $A_1$ and $A_2$, causes the diodes to emit signals $V_1$ and $V_2$ proportional to the radiation intensity and the respective surface areas of each exposed to radiation. Each of the diode signals are supplied to circuit 21 that includes an add circuit 22 for summing the signals and a subtract circuit 24 for obtaining a differential of the signals for respectively emitting a sum signal S and a difference signal D. Preferably supplied to signal D via add circuit 26 are calibration settings in the form of $\beta$ span adjustment and a zero adjustment from simple voltage dividing potentiometers 28 and 30, respectively. The output of circuit 26 comprises a measured input signal M supplied to a dual slope integrating analog-to-digital converter 32. Signal S, likewise supplied to converter 32, comprises the reference input thereto. Converter 32, as will be further described below, operates to compare measured input signal M to reference input signal S on the basis of their ratio M/S × constant to effect a continuous digital signal O for readout 34 and/or other connection 36. Signals 34 and/or 36 in this manner accurately represent the position of vane 16 with respect to diodes 10 and 12 at any point in time.

Converter 32, as will now be briefly discussed with reference to FIG. 6, comprises the well known A/D dual slope type disclosed, for example, in U.S. Pat. Nos. 3,061,939; 3,316,546; 3,458,809, 3,660,834 and 3,566,397. Briefly, the method of conversion involves integrating a current directly related to an unknown voltage for a fixed period of time, followed by the integration of a standard current related to a reference voltage of opposite polarity until the integrator output returns to zero. The time quantity required to null the integrator is directly proportional to the ratio of the measured current to the standard current and, therefore, to the measured voltage. In this sense, the integrator is a circuit producing a linearly changing output with time (usually a ramp) when the input is some constant voltage. The rate of integrator output voltage increase is directly proportional to the magnitude of input voltage. When input voltage is zero, output voltage is not subject to change but remains zero at whatever output value was achieved at the beginning of the time period.

Figure 6:
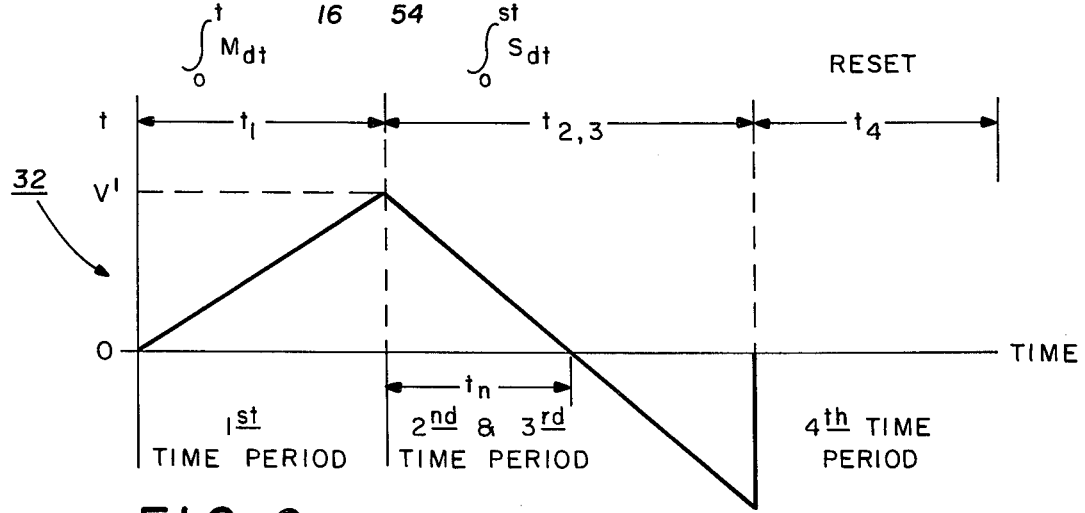
FIG. 6 is a diagramatic output voltage vs. time representation of a dual slope integrating analog-to-digital converter.

The time period shown in FIG. 6 is subdivided into four equal time parts $t_1$, $t_2$, $t_3$ and $t_4$ and an unknown voltage M to be measured is applied to the input of the integrator for a fixed time period $t_1$. The cycle is begun in time period $t_1$ during which an increasingly linear change in output voltage of the integrator is achieved until producing an output voltage V'. At that point in time, reference voltage S of opposite polarity is applied to the input while M is removed. For the next two time periods ($t_{2,3}$) integrator output voltage changes linearly in the negative direction passing through the zero axis in a time period $t_n$ and integrates at the end of the third time period to a negative value of voltage. When the latter occurs, all voltage is removed from the integrator input and its capacitor is discharged bringing output V' back to zero. This completes the cycle at which time the integrator is again ready to begin the next conversion. If, for example, reference input S is held at 2 volts, measured input M varies from 0 to 2 volts and full scale digital value of the converter is 1.999, then output O will vary between 0 and 1.999 for a 2 volt measured variation. Should the reference be lowered to 1 volt, then full scale readout of 1.999 will occur for a measured input of only 1 volt.

Since duration of time period $t_1$ is fixed, the achieved value of V' is proportional to the value of M being integrated. The output slope during $t_1$ is V'/$t_1$ and is, of course, variable and proportional to the value of M. However, with S remaining relatively constant, negative slope V'/$t_n$ during $t_{2,3}$ also remains constant regardless of values M and V'. The time required for integrator output to change from V' back to zero is proportional to the ratio of M to S and duration of constant $t_1$ such that $t_n = t_1(M/S)$. Accumulation of pulses in a digital counter during the period "$t_n$" produces a digital output from the counter which is a measure of the time and therefore of the input voltage M divided by S. Whereas the integrator characteristics are affected by temperature, the use of a proportional ratio signal eliminates its effect in the measure of $t_n$.

With the foregoing in mind, eliminating the effects of temperature change, supply voltage variation, aging factors, etc. can be further understood with respect to the following where:

$A_1$ = the radiation exposed surface area of diode 10
$A_2$ = the radiation exposed surface area of diode 12
$\theta$ = an overall sensitivity factor
B = light intensity
$V_1 = \theta B A_1$ and comprises the output voltage signal of diode 10
$V_2 = \theta B A_2$ and comprises the output voltage signal of diode 12
$\beta$ = the span adjustment factor
$\alpha$ = the zero adjustment factor
C = full scale digital value of converter 32

With like sensitivity factors $\theta$ and a uniform light intensity B transmitted to both diodes 10 and 12, signal $S = \theta B (A_1 + A_2)$ and signal $D = \theta B (A_1 - A_2)$ to produce measured input signal $M = \beta\theta B (A_1 - A_2) + \alpha\theta B (A_1 + A_2)$. Therefore, digital signal output $$O = \left[ \frac{(A_1 - A_2)}{(A_1 + A_2)} \beta + \alpha \right] \times C$$

Since digital output O is a function only of the ratio of the sum and difference between the exposed areas $A_1$ and $A_2$ the adverse effects of fluctuating variables previously encountered are directly cancelled by the ratio and thereby eliminated.

Figure 2:
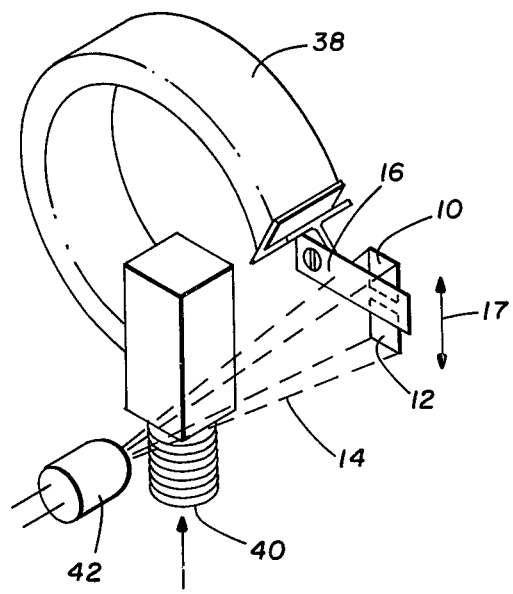
FIG. 2 is an isometric schematic of a specific end use employing the invention embodiment of FIG. 1 for gauge pressure measurement.
Figure 3:
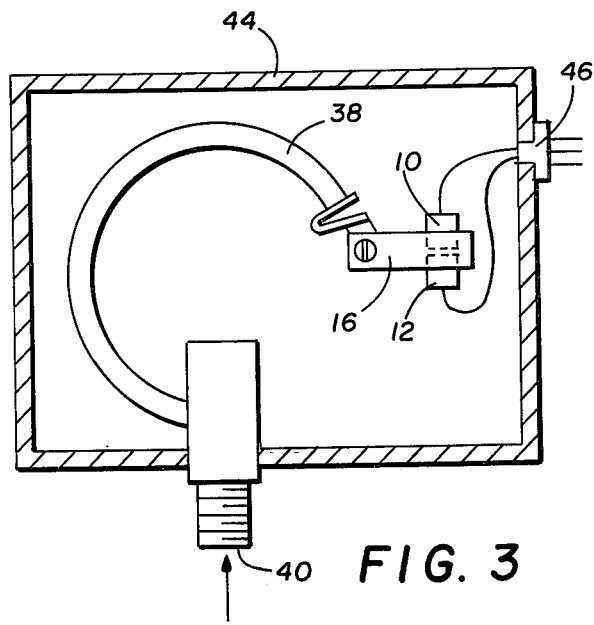
FIG. 3 is a variation of FIG. 2 for effecting absolute pressure measurement.

As utilized in the end use of FIG. 2, vane 16 is operably displaced in direction 17 by a condition responsive Bourdon tube 38 to which pressure of fluid being measured is supplied at inlet 40. Supplying light field 14 is lamp source 42 which illuminates diodes 10 and 12 varied as above by the position displacement of vane 16. Since displacement of vane 16 will occur in direct proportion to pressure changes at 40 readout 34 and/or 36 at any point in time will represent the current value of gauge pressure being measured. Utilization of this arrangement also lends itself to pressure changes supplied at 40 but generated instead from a gas filled closed system of temperature measurement. In FIG. 3, Bourdon tube 38 is adapted for absolute pressure sensitivity by being contained in an evacuated housing 44 to which signal leads for diodes 10 and 12 and light source 42 are supplied through seal 46.

Figure 4:
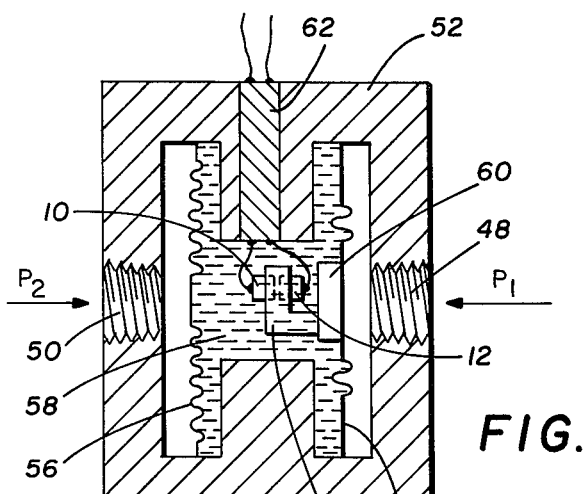
FIG. 4 is a further variation of FIG. 2 for effecting differential pressure measurement.
Figure 5:
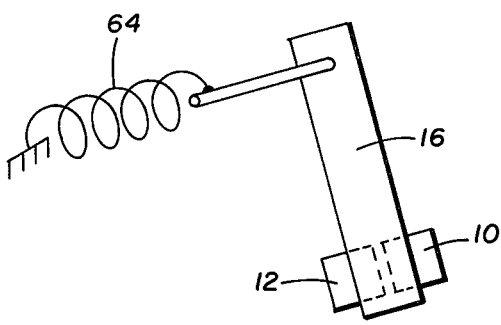
FIG. 5 is another end use embodying the invention principles of FIG. 1 for effecting bi-metal temperature measurement.

In FIG. 4, differential pressure measurement is similarly obtained between two inlet pressures $P_1$ and $P_2$ supplied through opposite inlets 48 and 50, respectively, of a housing 52. Respective input pressures are imposed in diaphragms 54 and 56 containing a transparent fluid fill 58 therebetween in which diodes 10 and 12 are securely positioned. Mounted in the face of diaphragm 54 is a sensing diaphragm 60 to which an L-shaped opaque vane 16 is secured for transverse movement with respect to the illuminated diode surfaces similarly as described above. Signal leads for the diodes and light source are supplied through seal 62. Still another version utilizing the concepts hereof is illustrated in FIG. 5 in which vane 16 is displaced by a bimetal temperature spring 64 in response to temperature changes to which it is exposed. As applied to these embodiments, it should be recognized that since return integration of converter 32 is of a time duration $t_n$, its duration can be converted to an electronic pulse whose duration is a measure of the pressure or a burst of pulses at a fixed frequency during time period $t_n$. In the latter case, the number of pulses would represent the measure of vane displacement.

Figure 7:
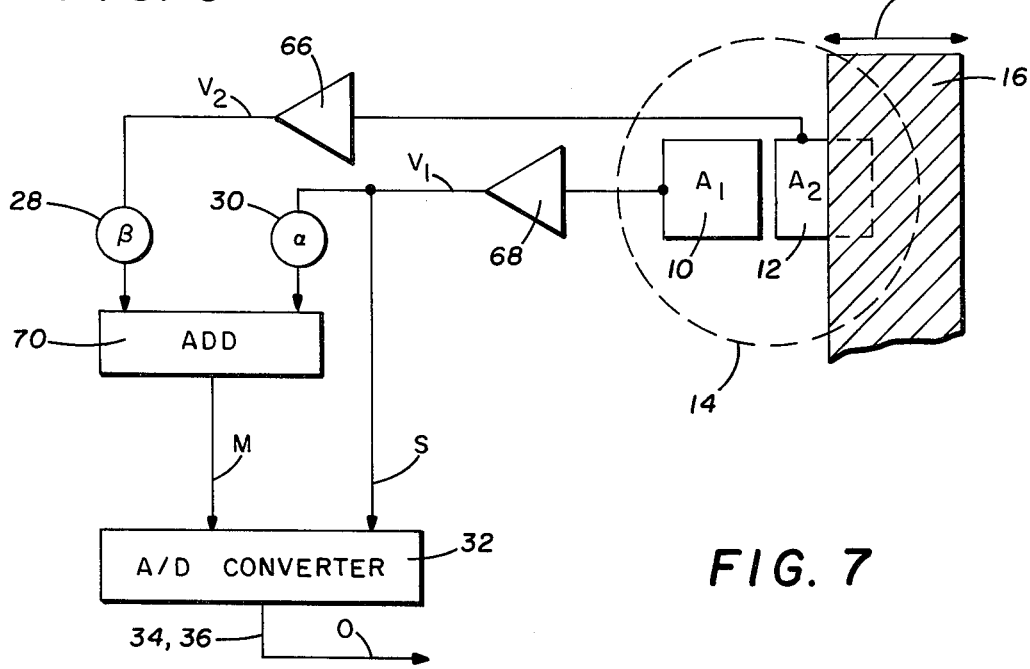
FIG. 7 is a schematic representation of a second embodiment of the invention.

The second embodiment hereof will now be described with specific reference to the alternative embodiment of FIG. 7. Unlike the previous embodiment, diode 10 hereof is uniformly illuminated over its entire area $A_1$ by light field 14 such that only diode 12 is subject to exposure changes in area $A_2$ by vane 16 in the course of vane displacement. Because of the low output current signals of the diodes the signal levels are increased via amplifiers 66 and 68, respectively, with output of the latter representing the constant reference input S supplied to converter 32. Amplified outputs $V_2$ of diode 12 modified by span adjustment $\beta$ and $V_1$ of diode 10 modified by zero adjustment $\alpha$ are supplied to add circuit 70. Output M of circuit 70 comprises the measured input to converter 32. The converter then emits a ratioed digital output similarly as before to represent the current position state of vane 16. Since $V_1$ is constant and the total change in vane position is due entirely to $V_2$, need of a substraction circuit such as 24 of the prior embodiment is eliminated.

While still requiring a reference based bias applied to the measured signal for use as the zero adjustment, this approach is comparatively simplified over that originally described. That is, by generating the measured signal from a single diode as compared to the dual diode signal generation previously described only half the signal level is generated as compared to that of the previous embodiment.

So long as the converter is an integral unit, the clock used to time the conversion system need not be highly accurate since those pulses used to time the integration process are the same as those providing input during the $t_n$ period as not to effect the calculated ratio. However, where these components are remote from each other, an accurate crystal oscillator (not shown) may be necessary to assure that the receiver usually operated by an independent accurate clock frequency is unaffected by frequency changes of an otherwise inaccurate transmitting clock. Conversion of the pulse to a parallel digital output signal and output digital display are well known techniques utilizing a conventional digital counter along with a simple latching register and decoder drivers operating display modules. On this basis, transmission distance is limited only by the proper selection of appropriate transmission line drivers and receivers as is well known. For transmission of a pulse burst in which the number of pulses represents the vane motion accurate timing at both ends would not be required since they need merely be counted at the receiving end.

By the above description there is disclosed a novel transducer for converting position displacement to a digital electrical signal by photo optical determination. Being relatively simple and inexpensive to assemble, the system lends itself to an endless variety of end uses of which only several have been specifically identified.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. Position sensing apparatus comprising in combination:
   (a) a pair of spaced apart elements having radiation sensitive surfaces of predetermined active area, each of said elements being adapted to emit a discrete analog electrical signal of magnitude continuously correlated to its relative active surface area to which radiation is exposed;
   (b) a radiation source for emitting radiation energy to which said elements are sensitive and positioned to project its emitted radiation in a uniform path toward the active surface areas of said elements;
   (c) an opaque vane at an intermediate location between said source and said elements and transversely movable at least bidirectionally through an operating range in said radiation path for relatively varying the exposed active surface areas of said elements and said correlated signals emitted therefrom; and
   (d) analog-digital circuit means operable to receive the correlated separate signals from each of said elements and to emit continuously a digital output signal correlated to the active surface area of said elements to which radiation is interrupted or uninterrupted at any given position throughout the operating range of said vane.

2. Position sensing apparatus according to claim 1 in which said vane is movable throughout an operating range within a portion of radiation path projected toward only one of said elements.

3. Position sensing apparatus according to claim 2 in which said circuit means includes a dual slope integrating analog-to-digital converter for effecting said digital output signal and the signal emitted by said one element comprises the measured input to said converter while the signal emitted by the other of said elements comprises the reference input to said converter.

4. Position sensing apparatus according to claim 3 in which the digital output signal of said converter is correlated to the ratio of measured to reference inputs thereto.

5. Position sensing apparatus according to claim 1 in which said vane is movable throughout an operating range within the radiation path projected toward both of said elements.

6. Position sensing apparatus according to claim 5 in which said circuit means includes means to effect a first signal related to the sum of said element signals and a second signal related to the difference between said element signals.

7. Position sensing apparatus according to claim 6 in which said circuit means includes a dual slope integrating analog-to-digital converter and one of said first or second signals comprises the reference input supplied to said converter while the other of said first or second signals comprises the measured input supplied to said converter.

8. Position sensing apparatus according to claim 7 in which the digital output signal of said converter is correlated to the ratio of measured to reference inputs thereto.

9. Position sensing apparatus according to claim 7 in which said circuit means includes adjustment means operable to calibrate the inputs to said converter.

10. Position sensing apparatus according to claim 7 including condition responsive means operative for movably displacing said vane in response to condition changes to which said condition responsive means is sensitive.

11. Position sensing apparatus according to claim 10 in which said condition responsive means comprises a Bourdon tube.

12. Position sensing apparatus according to claim 10 in which said condition responsive means comprises a differential pressure unit.

13. Position sensing apparatus according to claim 10 in which said condition responsive means comprises a temperature sensitive element.

14. Condition responsive apparatus comprising in combination:
   (a) a condition responsive element operative to initiate movement in response to condition changes to which it is sensitive;
   (b) a pair of spaced apart elements having radiation sensitive surfaces of predetermined active area, each of said elements being adapted to emit a discrete electrical analog signal of magnitude continuously correlated to its relative active surface area to which radiation is exposed;
   (c) a radiation source for emitting radiation energy to which said elements are sensitive and positioned to project its emitted radiation in a uniform path toward the active surface areas of said elements;
   (d) an opaque vane at an intermediate location between said source and said elements and transversely movable at least bidirectionally by said condition responsive element through an operating range in said radiation path for relatively varying the exposed active surface areas of said elements and said correlated signals emitted therefrom; and
   (e) analog-digital circuit means operable to receive the correlated separate signals from each of said elements and to emit continuously a digital output signal correlated to the active surface area of said elements to which radiation is interrupted or uninterrupted at any given position throughout the operating range of said vane.

15. Condition responsive apparatus according to claim 14 in which said vane is movable throughout an operating range within a portion of radiation path projected toward only one of said elements.

16. Condition responsive apparatus according to claim 15 in which said circuit means includes a dual slope integrating analog-to-digital converter for effecting said digital output signal and the signal emitted by said one element comprises the measured input to said converter while the signal emitted by the other of said elements comprises the reference input to said converter.

17. Condition responsive apparatus according to claim 16 in which the digital output signal of said converter is correlated to the ratio of measured to reference inputs thereto.

18. Condition responsive apparatus according to claim 14 in which said vane is movable throughout an operating range within the radiation path projected toward both of said elements.

19. Condition responsive apparatus according to claim 18 in which said circuit means includes means to effect a first signal related to the sum of said element signals and a second signal related to the difference between said element signals.

20. Condition responsive apparatus according to claim 19 in which said circuit means includes a dual slope integrating analog-to-digital converter and one of said first or second signals comprises the reference input supplied to said converter while the other of said first or second signals comprises the measured input supplied to said converter.

21. Condition responsive apparatus according to claim 20 in which the digital output signal of said converter is correlated to the ratio of measured to reference inputs thereto.

22. Condition responsive apparatus according to claim 14 in which said condition responsive element comprises a Bourdon tube.

23. Condition responsive apparatus according to claim 14 in which said condition responsive element comprises a differential pressure unit.

24. Condition responsive apparatus according to claim 14 in which said condition responsive element comprises a temperature sensor.

* * * * *